UNITED STATES PATENT OFFICE.

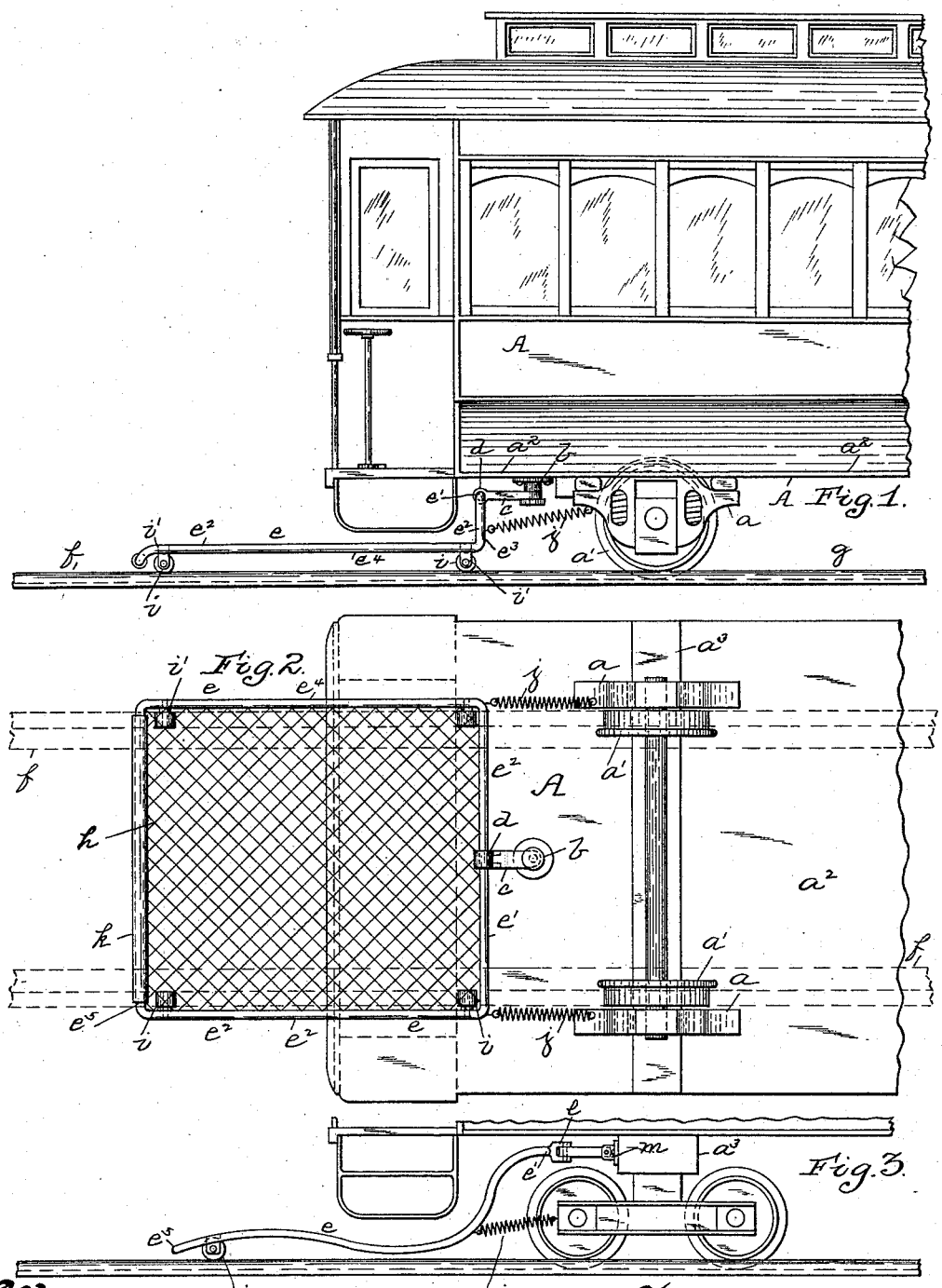

OLIVER L. BADGER, OF PITTSBURG, PENNSYLVANIA.

CAR-FENDER.

SPECIFICATION forming part of Letters Patent No. 580,751, dated April 13, 1897.

Application filed January 30, 1897. Serial No. 621,280. (No model.)

*To all whom it may concern:*

Be it known that I, OLIVER L. BADGER, a citizen of the United States, residing at Pittsburg, in the county of Allegheny and State of Pennsylvania, have invented certain new and useful Improvements in Car-Fenders; and I do hereby declare the following to be a full, clear, and exact description thereof.

My invention relates to fenders for cars, and has special reference to such as are adapted for use on electric, cable, or other railway cars.

The object of my invention is to supply a cheap and effective fender which will prevent injury or death to persons and animals that may be in the path of the car's movements.

Another object of my invention is to provide a fender which will cover the running-rails of the track when the car is passing around curves, as well as when the car is moving upon straight lines of track, and one which will retain the same position with relation to the road-bed regardless of the vertical tiltings of the car.

My invention consists, generally stated, in the novel construction, arrangement, and combination of parts hereinafter specifically set forth and described, and particularly pointed out in the claims.

To enable others skilled in the art to which my invention appertains to make and use the same, I will describe the same more fully, referring to the accompanying drawings, in which—

Figure 1 is a side view of the end of a car, showing one form of my improved car-fender applied thereto in its normal position. Fig. 2 is a bottom view thereof; and Fig. 3 shows a side view of the bottom of a car, showing another form of my improved fender applied thereto.

Like letters herein indicate like parts in each of the figures of the drawings.

As illustrated in the drawings, A represents the car, which can be of any form of approved construction desired and is provided with the truck $a$, carrying the wheels $a'$ therein. Secured to the floor $a^2$ of the car A is the boss $b$, around which is pivoted the link $c$, having an eye $d$ at its opposite end, which is adapted to fit around the upper or rear rod $e'$ of the fender $e$. The fender $e$ has its frame $e^2$ preferably formed of pipe or tubing, having the upright portion $e^3$ and the horizontal portion $e^4$ extending along close to the rails $f$, forming the roadbed $g$. The frame $e^2$ of the fender $e$ has a network of soft or yielding cords or wire $h$ strung between the same and the wheels $i$, hung in bearings $i'$ on the inside of the horizontal portion $e^4$ of the frame $e^2$ at the front and rear thereof, which are adapted to travel on the rails $f$. Spiral springs $j$ connect the upright portion $e^3$ of the fender $e$ and the truck $a$ of the car A, and, if desired, a layer of soft or yielding material $k$ can be placed around the front rod $e^5$ of the frame $e^2$.

The operation of my improved car-fender is as follows: During the momentum of the car A the parts composing the fender $e$ are in their normal position, as shown in Fig. 1. When a person or animal is struck by the fender $e$ the fender $e$ will remain in the position shown in Fig. 1 and catch the person or animal upon the horizontal portion $e^4$ of the fender $e$, and prevent injury or possible death to the same. The springs $j$, connected to the fender $e$, prevent the wheels $i$ from leaving the rails $f$ when an object is hit by the fender $e$ and will always keep the horizontal portion $e^4$ adjacent to and close to the rails $f$. In case of the tilting of the car A the eye $d$, fitting around the rear rod $e'$ on the upright portion $e^3$, will always prevent the raising of the fender $e$ through the medium of the springs $j$ bearing on the fender $e$. During the traversing of the car A around curves, the link $c$ fitting around the boss $b$, will allow the fender $e$ to swing in a lateral movement, so as to conform to the position of the car A during its travels.

In Fig. 3 of the drawings is shown my improved car-fender $e$ provided with only one set of wheels $i$ on the front of the fender $e$. In this case the frame $e^2$ of the fender $e$ is preferably formed on an ogee curve extending from the front rod $e^5$ to the rear rod $e'$, and the rear rod $e^5$ is provided with a bifurcated bearing $l$, within which the link $c$ is pivoted so as to provide for the lateral swinging of the fender $e$ during the momentum of traveling of the car A in passing around curves. The link $c$ is secured at its opposite end in a bifurcated bearing $m$, secured on the truck-beam $a^3$ of the car A, and the springs $j$ are secured to the fender e and truck a in any suitable manner. The position of the link in this case is reversed from that shown in Fig. 1.

If desired, suitable mechanism can be applied to the car-fender to be operated by the operator from the car for raising the fender to allow the same to pass over any obstructions or obstacles on the road-bed.

It will thus be seen that my improved car-fender is simple in its construction and effective in its operation. The parts can be readily transferred from one car to another and without any material change in any of the parts. The device is cheap and will prevent loss of life and injury to persons and animals coming in contact therewith. Each car may be and preferably is furnished with a fender at either end, and the particular shape and location of which can be changed or varied as desired without departing from the spirit of the invention or sacrificing any of its advantages.

What I claim, and desire to secure by Letters Patent, is—

1. A car-fender having wheels thereon adapted to engage with the rails, connections from said fender to the car, whereby the fender may have vertically and laterally swinging movements with relation to the car, and springs connected to the fender and to the truck of the car to hold the wheels of the fender down upon the rails, substantially as set forth.

2. A car-fender, comprising a frame having wheels thereon adapted to engage with the rails, a link pivoted to the rear of said frame and pivoted to the car, whereby the fender may have vertically and laterally swinging movements with relation to the car, and springs connected to the frame and to the truck of the car to hold the wheels of the fender down upon the rails, substantially as set forth.

3. A car-fender, comprising a frame having wheels thereon adapted to engage with the rails, a link pivoted to the rear of the frame and to the truck of the car, whereby the fender may have vertically and laterally swinging movements with relation to the car, and springs connected to the frame and to the truck of the car to hold the wheels of the fender down upon the rails, substantially as described.

In testimony whereof I, the said OLIVER L. BADGER, have hereunto set my hand.

OLIVER L. BADGER.

Witnesses:
MABEL DOW,
J. N. COOKE.